United States Patent
Kawae et al.

(10) Patent No.: US 11,885,347 B2
(45) Date of Patent: Jan. 30, 2024

(54) CENTRIFUGAL COMPRESSOR

(71) Applicant: DAIKIN INDUSTRIES, LTD., Osaka (JP)

(72) Inventors: Arisa Kawae, Osaka (JP); Kousuke Nishimura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 132 days.

(21) Appl. No.: 17/485,988

(22) Filed: Sep. 27, 2021

(65) Prior Publication Data
US 2022/0010804 A1 Jan. 13, 2022

Related U.S. Application Data

(63) Continuation of application No. PCT/JP2020/003200, filed on Jan. 29, 2020.

(30) Foreign Application Priority Data

Mar. 28, 2019 (JP) .................. 2019-062829

(51) Int. Cl.
*F04D 29/056* (2006.01)
*F04D 17/10* (2006.01)

(52) U.S. Cl.
CPC .......... *F04D 29/056* (2013.01); *F04D 17/10* (2013.01)

(58) Field of Classification Search
CPC ...... F04D 17/10; F04D 29/056; F04D 29/057; F04D 29/284
See application file for complete search history.

(56) References Cited

U.S. PATENT DOCUMENTS

| 3,395,949 A | 8/1968 | Kun | |
|---|---|---|---|
| 2016/0201686 A1* | 7/2016 | Vogt | F04D 17/105 415/173.1 |
| 2017/0016452 A1 | 1/2017 | Shoyama et al. | |

FOREIGN PATENT DOCUMENTS

| JP | 2003-247426 A | 9/2003 |
|---|---|---|
| JP | 2004-162559 A | 6/2004 |
| JP | 2012-251529 A | 12/2012 |
| JP | 2013-68285 A | 4/2013 |
| JP | 2013-127205 A | 6/2013 |

(Continued)

OTHER PUBLICATIONS

International Preliminary Report of corresponding PCT Application No. PCT/JP2020/003200 dated Oct. 7, 2021.

(Continued)

*Primary Examiner* — Kenneth J Hansen
(74) *Attorney, Agent, or Firm* — Global IP Counselors, LLP

(57) ABSTRACT

A centrifugal compressor includes a shaft member and an impeller. The shaft member extends in an axial direction and is rotatable. The impeller includes a hub that is disposed on an end portion of the shaft member, and a plurality of blades disposed on an outer peripheral surface of the hub. The impeller has a shape that tapers outward in the axial direction. A cover member is disposed at least at an end portion of the impeller outside in the axial direction. The cover member is joined to outer peripheries of the plurality of blades in a radial direction and covers at least a part of the plurality of blades from outside in the radial direction. A first bearing is disposed outside in the radial direction of the cover member, the first rotatably supporting the impeller.

7 Claims, 9 Drawing Sheets

(56) References Cited

FOREIGN PATENT DOCUMENTS

| JP | 2015-143474 A | 8/2015 | |
|----|---------------|--------|---|
| WO | 2014/038202 A1 | 3/2014 | |
| WO | 2019/089183 A1 | 5/2019 | |
| WO | WO-2019089183 A1 * | 5/2019 | ........... F04D 29/046 |

OTHER PUBLICATIONS

International Search Report of corresponding PCT Application No. PCT/JP2020/003200 dated Mar. 31, 2020.
European Search Report of corresponding EP Application No. 20 77 8156.8 dated Mar. 18, 2022.

* cited by examiner

CENTRIFUGAL COMPRESSOR

CROSS-REFERENCE TO RELATED APPLICATIONS

This is a continuation of International Application No. PCT/JP2020/003200 filed on Jan. 29, 2020, which claims priority to Japanese Patent Application No. 2019-062829 filed on Mar. 28, 2019. The entire disclosures of these applications are incorporated by reference herein.

BACKGROUND

Field of Invention

The present disclosure relates to a centrifugal compressor.

Background Information

In a turbo compressor such as a centrifugal compressor, a rotor is attached to the center of a rotation shaft, and an impeller is attached to one end or to each of two ends of the rotation shaft. A journal bearing (radial bearing) that supports the rotation shaft from outside in the radial direction is disposed on a part of the rotation shaft between the impeller and the rotor.

SUMMARY

A first aspect the present disclosure is a centrifugal compressor including a shaft member and an impeller. The shaft member extends in an axial direction and is rotatable. The impeller includes a hub that is disposed on an end portion of the shaft member, and a plurality of blades disposed on an outer peripheral surface of the hub. The impeller has a shape that tapers outward in the axial direction. A cover member is disposed at least at an end portion of the impeller outside in the axial direction. The cover member is joined to outer peripheries of the plurality of blades in a radial direction and covers at least a part of the plurality of blades from outside in the radial direction. A first bearing is disposed outside in the radial direction of the cover member, the first rotatably supporting the impeller.

DETAILED DESCRIPTION OF EMBODIMENT(S)

Hereafter, embodiments of the present disclosure will be described with reference to the drawings. Embodiments described below are preferable examples and are not intended to limit the present invention, the application thereof, or the range of use thereof.

Configuration of Centrifugal Compressor

Figure 1:
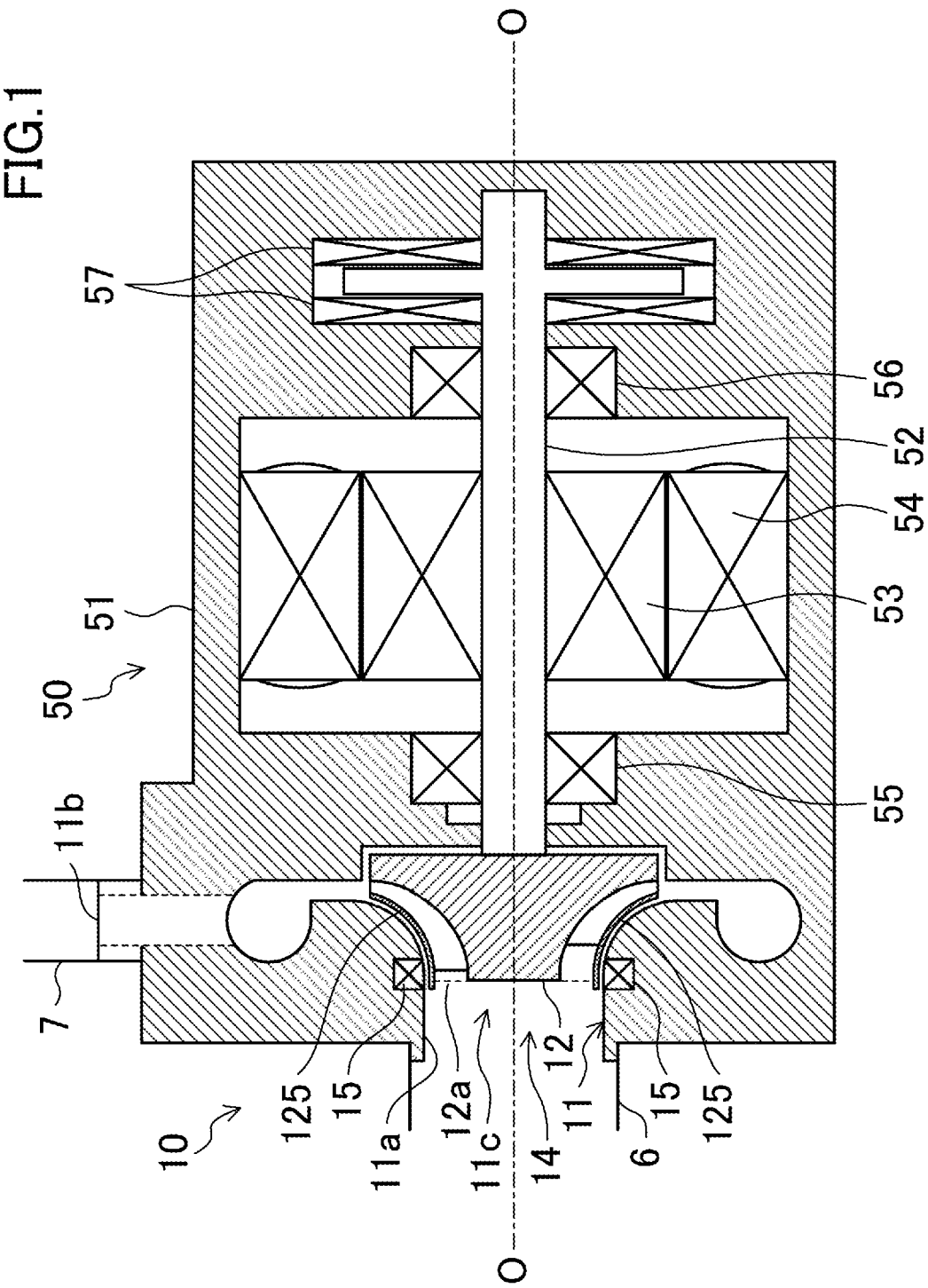
FIG. 1 is a schematic sectional view of a centrifugal compressor according to an embodiment.
Figure 2:
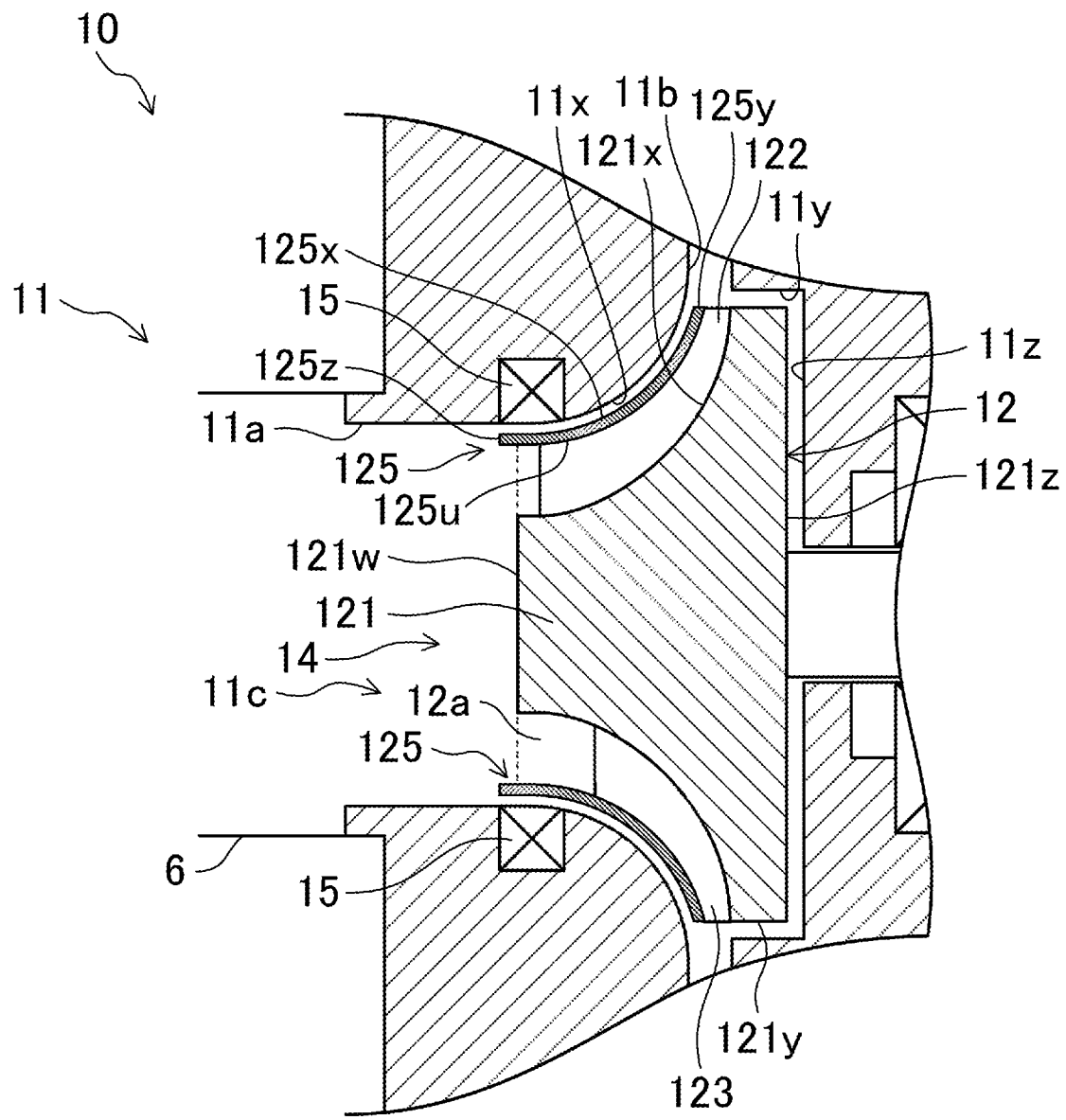
FIG. 2 is a schematic enlarged sectional view of the vicinity of an impeller of the centrifugal compressor illustrated in FIG. 1.
Figure 3:
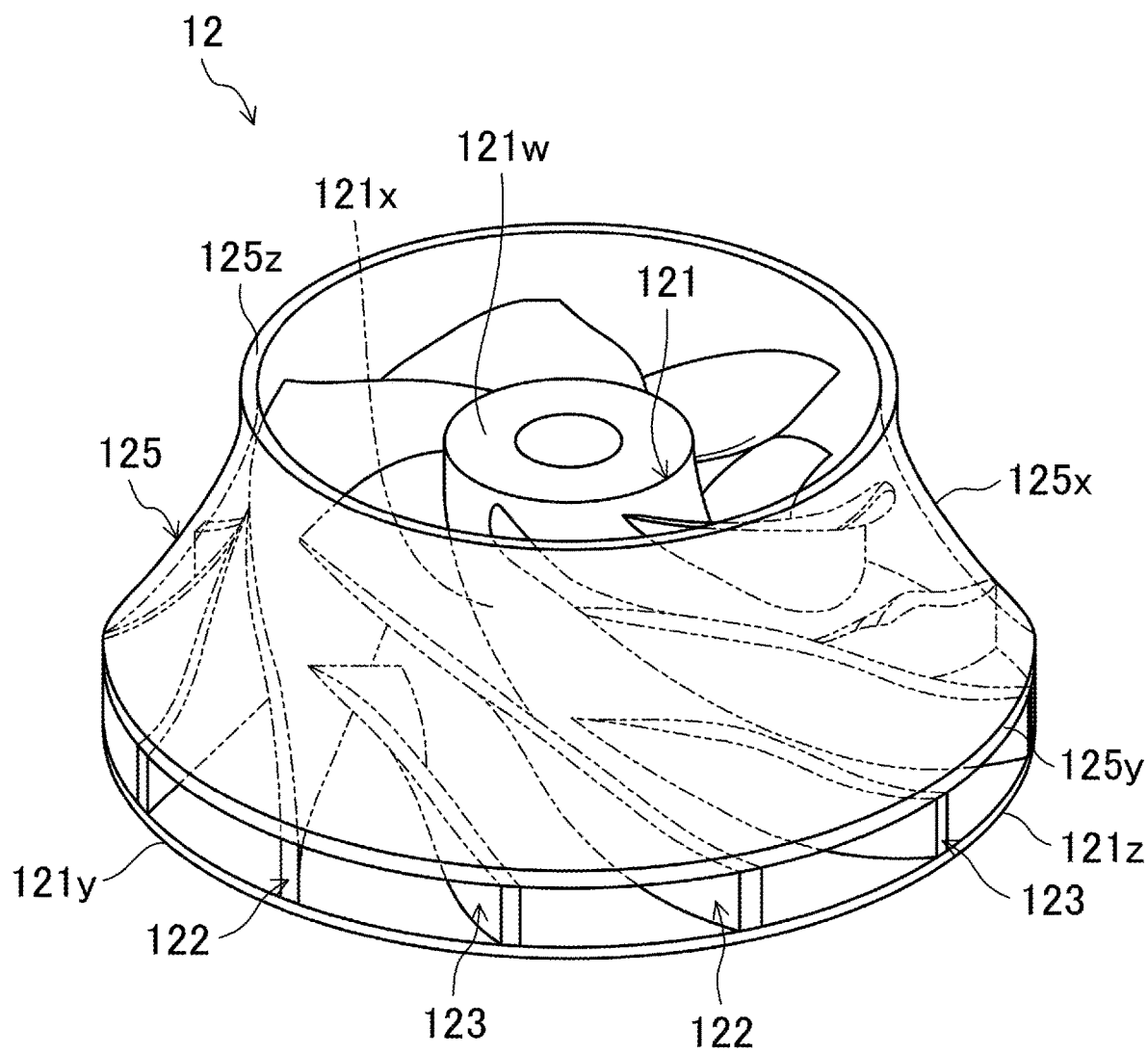
FIG. 3 is a schematic perspective view of the impeller of the centrifugal compressor illustrated in FIG. 1.

FIG. 1 is a schematic sectional view of a centrifugal compressor according to an embodiment. FIG. 2 is a schematic enlarged sectional view of the vicinity of an impeller of the centrifugal compressor illustrated in FIG. 1. FIG. 3 is a schematic perspective view of the impeller of the centrifugal compressor illustrated in FIG. 1.

The centrifugal compressor illustrated in FIG. 1 mainly includes a motor (50) and a compression mechanism (10).

The motor (50), which is a motor for driving the compression mechanism (10), mainly includes a motor casing (51), a shaft member (rotation shaft) (52), a rotor (53), and a stator (54).

In the present disclosure, the rotation center of the shaft member (52) is denoted by "O", the rotation axis of the shaft member (52) is denoted by "O—O", and a direction along the rotation axis O—O is defined as "axial direction". In the axial direction, the compression mechanism (10) side is defined as "front side" and a side opposite to the compression mechanism (10) side is defined as "back side". A direction toward the rotation axis O—O is defined as "inside in the radial direction" (inside in the rotational radius direction) and a direction away from the rotation axis O-O is defined as "outside in the radial direction" (outside in the rotational radius direction).

The motor casing (51) has a space for accommodating the shaft member (52), the rotor (53), and the stator (54). The shaft member (52) is rotatably supported by rotor-side radial bearings (55) and (56). The rotor-side radial bearings (55) and (56) are fixed to the motor casing (51) in such a way that the rotor (53) is interposed therebetween. One end of the shaft member (52) in the axial direction (the left end in FIG. 1) protrudes toward the compression mechanism (10) side. The other end of the shaft member (52) in the axial direction (the right end in FIG. 1) is slidably supported by a thrust bearing (57) that is fixed to the motor casing (51). The rotor (53) is supported by the shaft member (52) between the rotor-side radial bearings (55) and (56) in the axial direction so that the rotor (53) can rotate together with the shaft member (52). The stator (54) is fixed to the motor casing (51) so as to surround the outer periphery of the rotor (53).

In the present embodiment, the compression mechanism (10) is a single-stage centrifugal compression mechanism. The compression mechanism (10) mainly includes a compression mechanism casing (11) and a closed impeller (14). The compression mechanism casing (11) mainly includes an intake opening (11a), a discharge opening (11b), and an impeller housing (11c). The intake opening (11a) opens toward one end of the compression mechanism casing (11)

in the axial direction (the left end in FIG. 1) and is connected to an intake pipe (6). The discharge opening (11b) opens toward an outer end in the circumferential direction (the upper end in FIG. 1) of the compression mechanism casing (11) and is connected to a discharge pipe (7).

The impeller housing (11c) rotatably accommodates the closed impeller (14). As illustrated in FIG. 2, the impeller housing (11c) is formed mainly by a front wall (11x), an outer peripheral wall (11y), and a back wall (11z) that serves as a sealing plate. The front wall (11x) bulges toward the back side and inside in the radial direction and smoothly connects the deep side of the intake opening (11a) and the inside of the discharge opening (11b). In other words, the front wall (11x) has an annular bulging surface centered on the shaft member (52). The outer peripheral wall (11y) has a cylindrical surface extending from the inside of the discharge opening (11b) backward in the axial direction. The back wall (11z) has a disc-like shape expanding outward in the radial direction with the vicinity of the outer peripheral surface of the shaft member (52) as the inner peripheral end surface thereof.

The closed impeller (14) mainly includes an impeller (12) and a cover member (125) that is fixed to an outer periphery of the impeller (12). The impeller (12) mainly includes a hub (121) that is disposed on one end of the shaft member (52) in the axial direction (the left end in FIG. 1) and a plurality of blades (122, 123) that are disposed on a front outer peripheral surface of the hub (121). The impeller (12) has a shape that tapers outward (toward the front side) in the axial direction of the shaft member (52), and rotates about the shaft member (52) that supports the hub (121). The hub (121) and the plurality of blades (122, 123) may be an integrated impeller that is made of, for example, an aluminum alloy. The inside of the hub (121), excluding a part around the shaft and an outer edge part, may be hollow, in view of reduction of weight.

The back side of the hub (121) has a hub back surface (121z) that is a circular flat surface expanding in the radial direction. The hub back surface (121z) faces the back wall (11z) of the impeller housing (11c). The hub (121) has a substantially conical shape whose diameter increases from the front side toward the back side thereof. The front side of the hub (121) has a hub front surface (121w) that is a circular flat surface whose radius is smaller than the radius of the hub back surface (121z). The outer end portion of the hub (121) in the radial direction has a hub cylindrical surface (121y) whose center axis is the shaft member (52) and whose radius is substantially the same as that of the hub back surface (121z). The hub cylindrical surface (121y) faces the outer peripheral wall (11y) of the impeller housing (11c). An expanding curved surface (121x), which has a shape that is gently recessed backward and inward in the radial direction, connects the outer peripheral edge of the hub front surface (121w) in the radial direction to the front edge of the hub cylindrical surface (121y).

On the expanding curved surface (121x) of the impeller (12), large blades (122) and small blades (123) are alternately arranged at substantially regular intervals in the circumferential direction. The large blades (122) and the small blades (123) each extend from the expanding curved surface (121x) of the impeller (12) toward the front wall (11x) of the impeller housing (11c). The large blades (122) and the small blades (123), each of which extends spirally to wind leftward in a front view, are so-called "backward curved fan blades". In other words, the large blades (122) and the small blades (123) extend so as to turn leftward while expanding in the radial direction from the hub front surface (121w) toward the hub back surface (121z).

Each large blade (122) extends from a front end portion of the expanding curved surface (121x) of the impeller (12) to the hub back surface (121z). On the other hand, each small blade (123) is disposed between a corresponding pair of the large blades (122) and extends in the axial direction from a position that is approximately the midpoint between the hub front surface (121w) and the hub back surface (121z) to the hub back surface (121z).

The cover member (125) is formed so as to increase backward in diameter outward in the radial direction, and covers the entirety of the large blades (122) and the entirety of the small blades (123) from the front side and outside in the radial direction. That is, the cover member (125) of the present embodiment is a shroud that covers the entirety of the impeller (12).

A front end portion of the cover member (125) has a front end surface (125z). The front end surface (125z) faces the intake pipe (6) side and is located at substantially the same position as the hub front surface (121w) of the hub (121) in the axial direction. A back end portion of the cover member (125) has a back end surface (125y). The back end surface (125y) faces the discharge pipe (7) side and is located at substantially the same position as the hub cylindrical surface (121y) in the radial direction. A surface of the cover member (125) that is on the front side and outside in the radial direction is an outer curved surface (125x). The outer curved surface (125x) is curved and faces the front wall (11x) of the impeller housing (11c). The reverse side of the outer curved surface (125x) of the cover member (125) has an inner curved surface (125u). The inner curved surface (125u) bulges backward and inward in the radial direction.

The large blades (122) and the small blades (123) are disposed in a space surrounded by the expanding curved surface (121x) of the hub (121) and the inner curved surface (125u) the cover member (125). The space has refrigerant flow paths between the large blades (122) or between the large blades (122) and the small blades (123). The distance between the expanding curved surface (121x) of the hub (121) and the inner curved surface (125u) of the cover member (125) is the longest at the front end portion (intake side), decreases backward along the refrigerant flow paths, and is the shortest at the back end portion (discharge side).

The impeller (12) described above is obtained, for example, by integrally forming the hub (121), the large blades (122), and the small blades (123). The outer periphery of each the large blades (122) and the small blades (123) is joined to the inner curved surface (125u) of the cover member (125) by, for example, brazing. Thus, the cover member (125) is joined to the outer periphery of each of the plurality of blades (122, 123) so as to cover the plurality of blades (122, 123). The cover member (125) may be integrally formed with the hub (121) and the plurality of blades (122, 123) by, for example, cutting.

One feature of the present embodiment is that an impeller-side radial bearing (15) that rotatably supports the impeller (12) is disposed outside in the radial direction of the cover member (125). To be specific, a recessed portion is formed in the front wall (11x) of the impeller housing (11c) that faces a part of the cover member (125) that covers a front end portion (12a) of the impeller (12), and the impeller-side radial bearing (15) that is, for example, a gas bearing is embedded in the recessed portion.

In a case where the impeller-side radial bearing (15) is a dynamic pressure gas bearing, for example, a cylindrical sleeve that is made of a resin having a comparatively high thermal conductivity may be used as the impeller-side radial bearing (15). In this case, for example, an O-ring may be attached to an outer peripheral portion of the impeller-side radial bearing (15), and the impeller-side radial bearing (15) may be fixed to the impeller housing (11c) via the O-ring. The impeller-side radial bearing (15) that is a dynamic pressure gas bearing mainly supports a radial load of the impeller (12) in a non-contact manner when the impeller (12) and the shaft member (52) rotate. At this time, the supporting power of the impeller-side radial bearing (15) increases as the rotational speed of the impeller (12) and the shaft member (52) increases.

In a case where the impeller-side radial bearing (15) is a static pressure gas bearing, for example, a cylindrical sleeve that is made of a resin having a comparatively high thermal conductivity and that has an inner peripheral portion made of a porous material may be used as the impeller-side radial bearing (15). In this case, for example, an O-ring may be attached to an outer peripheral portion of the impeller-side radial bearing (15), and the impeller-side radial bearing (15) may be fixed to the impeller housing (11c) via the O-ring. A refrigerant chamber may be formed along the entire circumference of the impeller-side radial bearing (15). A refrigerant introducing path may be connected to the refrigerant chamber via a through-hole that extends in the radial direction through the outer peripheral portion of the impeller-side radial bearing (15). The refrigerant introducing path may extend through the impeller housing (11c) in the radial direction, and, for example, may communicate with a condenser in a refrigerant circuit in which the centrifugal compressor according to the present embodiment is disposed. Thus, a high-pressure gas refrigerant is introduced from the condenser into the refrigerant chamber of the impeller-side radial bearing (15) through the refrigerant introducing path. The impeller-side radial bearing (15) mainly supports a radial load of the impeller (12) in a non-contact manner by using the pressure of the gas refrigerant introduced into the refrigerant chamber.

Advantageous Effects of Embodiment

Figure 4:
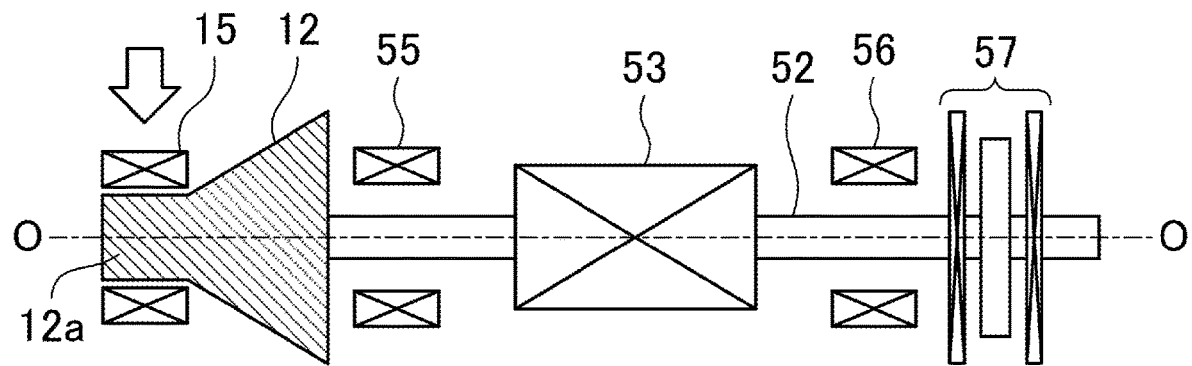
FIG. 4 is a schematic view of the centrifugal compressor according to the embodiment.

FIG. 4 is a schematic view of the centrifugal compressor according to the present embodiment. In FIG. 4, constituent elements that are the same as those of the centrifugal compressor illustrated in FIG. 1 are denoted by the same numerals. Although illustrations of the plurality of blades (122, 123) and the cover member (125) of the impeller (12) are omitted for simplicity in FIG. 4, the cover member (125) is joined to the outer peripheries of the plurality of blades (122, 123) in the radial direction, and the plurality of blades (122, 123) are covered by the cover member (125) from outside in the radial direction.

As illustrated in FIG. 4, in the centrifugal compressor according to the present embodiment, the impeller-side radial bearing (15) is disposed outside in the radial direction of the front end portion (12a) of the impeller (12) (to be specific, a part of the cover member (125) that covers the front end portion (12a)). Therefore, the radial load of the impeller (12) can be supported by the impeller-side radial bearing (15). Accordingly, even when the centrifugal compressor surges and a force in the radial direction is applied to the impeller (12), bending of the shaft member (52), that is, the rotation shaft can be suppressed, and therefore damage to other components, such as the rotor-side radial bearings (55, 56), can be suppressed.

In the centrifugal compressor according to the present embodiment, the cover member (125) is a shroud that covers the entirety of the plurality of blades (122, 123). Therefore, the closed impeller (14) is formed, and thus operation efficiency can be increased compared with an open impeller.

In the centrifugal compressor according to the present embodiment, in addition to the impeller-side radial bearing (15), the rotor-side radial bearings (55, 56) are disposed outside in the radial direction of the shaft member (52). Therefore, with the impeller-side radial bearing (15) that rotatably supports the impeller (12) and the rotor-side radial bearings (55, 56) that rotatably support the shaft member (52), bending of the shaft member (52) in a surge state can be suppressed in a well-balanced manner.

When a gas bearing is used as the impeller-side radial bearing (15) in the centrifugal compressor according to the present embodiment, the impeller (12) can be rotated with a higher speed compared with a case where a bearing of another type, such as a magnetic bearing, is used. When a dynamic pressure gas bearing is used as the impeller-side radial bearing (15), the impeller (12) can be rotated with a high speed at low cost. When a static pressure gas bearing is used as the impeller-side radial bearing (15), the radial load supporting power can be obtained also when the impeller (12) and the shaft member (52) start rotating.

Comparative Example

Figure 5:
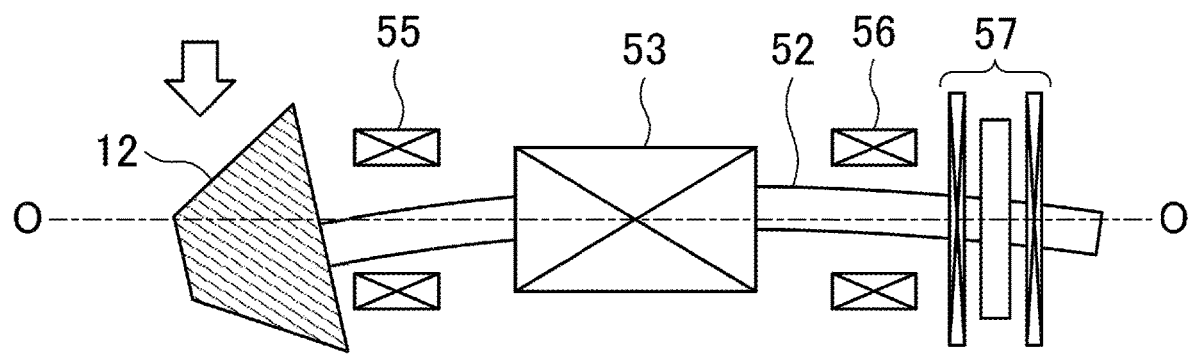
FIG. 5 is a schematic view of a centrifugal compressor according to a comparative example.

FIG. 5 is a schematic view of a centrifugal compressor according to a comparative example. In FIG. 5, constituent elements that are the same as those of the embodiment illustrated in FIG. 4 are denoted by the same numerals. Although illustrations of the plurality of blades (122, 123) and the cover member (125) of the impeller (12) are omitted for simplicity in FIG. 5, the cover member (125) is joined to the outer peripheries of the plurality of blades (122, 123) in the radial direction, and the plurality of blades (122, 123) are covered by the cover member (125) from outside in the radial direction.

The centrifugal compressor according to the comparative example differs from the embodiment illustrated in FIG. 4 in that, as illustrated in FIG. 5, the impeller-side radial bearing (15) is not disposed outside in the radial direction of the front end portion (12a) of the impeller (12) (to be specific, a part of the cover member (125) that covers the front end portion (12a)). In other words, in the centrifugal compressor according to the comparative example, the shaft member (52) to which the impeller (12) is attached is rotatably supported by only the rotor-side radial bearings (55) and (56).

As described above, in the centrifugal compressor according to the comparative example, while the impeller (12), which is heavy, is attached to an end portion of the shaft member (52), the rotor-side radial bearings (55) and (56) are disposed at positions that are closer than the impeller (12) to the center of the shaft member (52) in the axial direction. Therefore, when the centrifugal compressor surges, a force in the radial direction is applied to the impeller (12) and the shaft member (52) bends, and, as a result, other components, such as the rotor-side radial bearings (55) and (56), may become damaged.

First Modification

Figure 6:
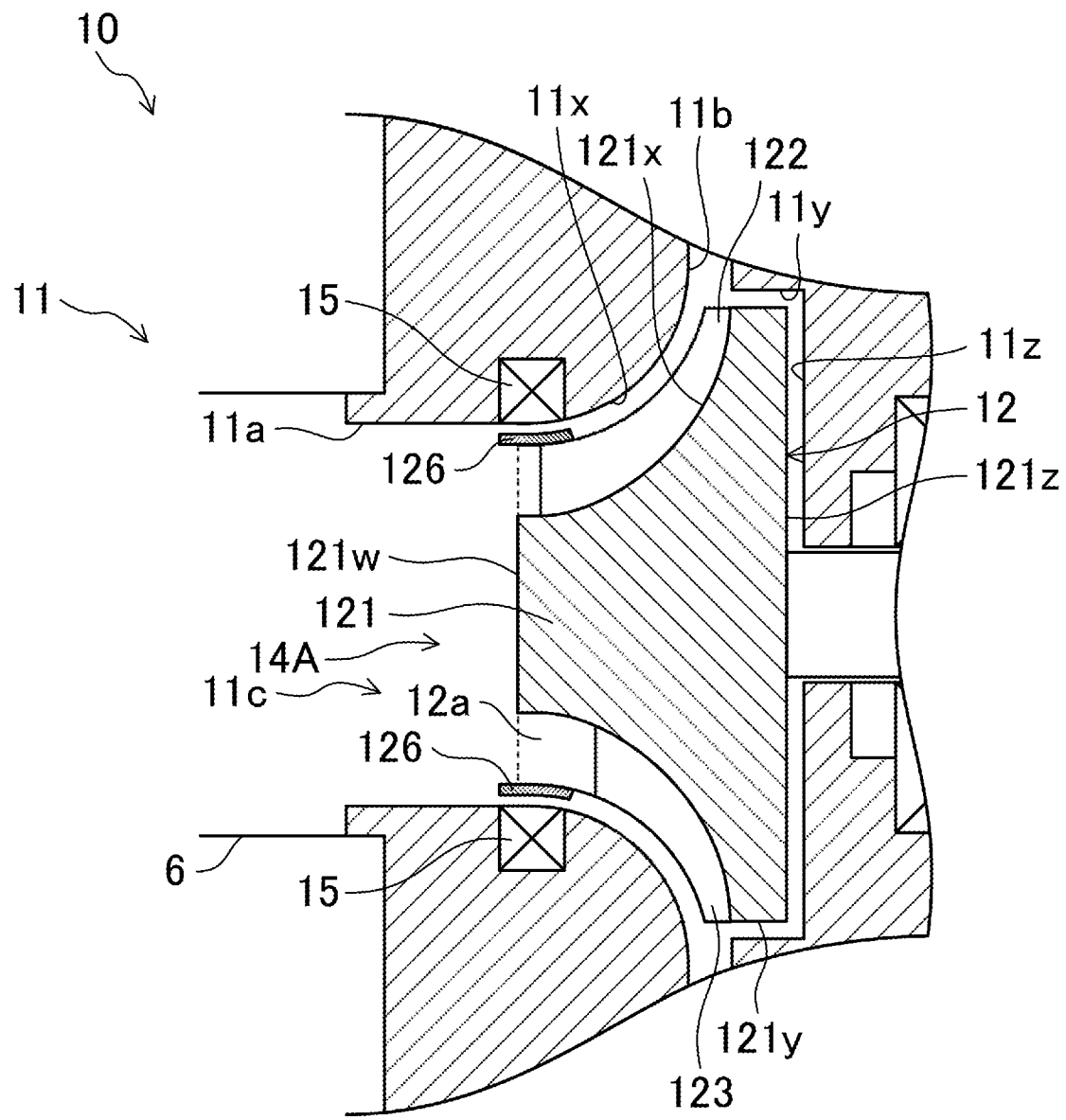
FIG. 6 is a schematic enlarged sectional view of the vicinity of an impeller of a centrifugal compressor according to a first modification.

FIG. 6 is a schematic enlarged sectional view of the vicinity of an impeller of a centrifugal compressor according to a first modification. In FIG. 6, constituent elements that are the same as those of the embodiment illustrated in FIG. 2 are denoted by the same numerals.

The centrifugal compressor according to the present modification differs from the embodiment illustrated in FIG.

2 in that, as illustrated in FIG. 6, instead of the cover member (125) that serves as a shroud that covers the entirety of the impeller (12), a cover member (126) is disposed only at the front end portion (12a) of the impeller (12). In other words, the cover member (126) covers only a part of the plurality of blades (122, 123) from outside in the radial direction. Thus, a semi-open impeller (14A) is formed.

In the centrifugal compressor according to the present modification, the cover member (126) may be joined to an outer periphery of a front portion of each of the large blades (122) so as to cover the front portion. The cover member (126) may be joined to the impeller (12) by, for example, brazing. Alternatively, the cover member (126) may be integrally formed with the hub (121) and the plurality of blades (122, 123) by cutting.

Advantageous Effects of First Modification

In the centrifugal compressor according to the present modification described above, the cover member (126) is disposed at the front end portion (12a) of the impeller (12), and the impeller-side radial bearing (15) that rotatably supports the impeller (12) is disposed outside in the radial direction of the cover member (126). Therefore, the radial load of the impeller (12) can be supported by the impeller-side radial bearing (15). Accordingly, even when the centrifugal compressor surges and a force in the radial direction is applied to the impeller (12), bending of the shaft member (52), that is, the rotation shaft can be suppressed, and therefore damage to other components, such as the rotor-side radial bearings (55, 56), can be suppressed.

Thus, with the centrifugal compressor according to the present modification, also in the semi-open impeller configuration, advantageous effects similar to those of the embodiment can be obtained.

Second Modification

Figure 7:
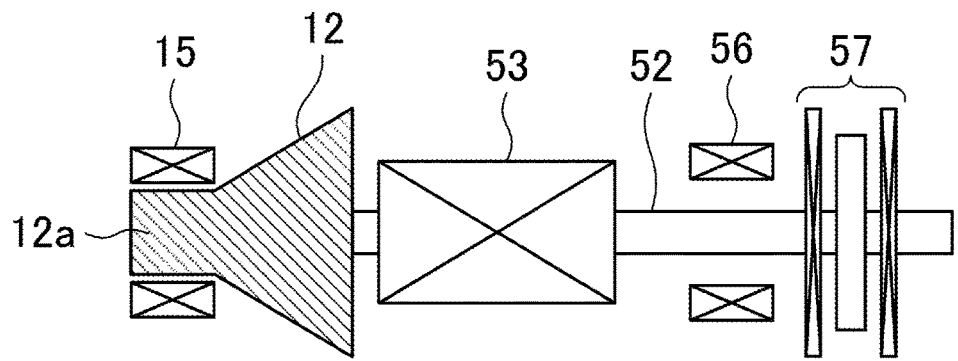
FIG. 7 is a schematic view of a centrifugal compressor according to a second modification.

FIG. 7 is a schematic view of a centrifugal compressor according to a second modification. In FIG. 7, constituent elements that are the same as those of the embodiment illustrated in FIG. 4 are denoted by the same numerals. Although illustrations of the plurality of blades (122, 123) and the cover member (125) of the impeller (12) are omitted for simplicity in FIG. 7, the cover member (125) is joined to the outer peripheries of the plurality of blades (122, 123) in the radial direction, and the plurality of blades (122, 123) are covered by the cover member (125) from outside in the radial direction.

The centrifugal compressor according to the present modification differs from the embodiment illustrated in FIG. 4 in that, as illustrated in FIG. 7, among the rotor-side radial bearings (55) and (56) that rotatably support the shaft member (52), the rotor-side radial bearing (55) that is closer to the impeller (12) is not provided.

Advantageous Effects of Second Modification

In the centrifugal compressor according to the present modification described above, as in the embodiment illustrated in FIG. 4, the impeller-side radial bearing (15) is disposed outside in the radial direction of the front end portion (12a) of the impeller (12) (to be specific, a part of the cover member (125) that covers the front end portion (12a)). Therefore, advantageous effects similar to those of the embodiment described above can be obtained.

In the centrifugal compressor according to the present modification, the impeller (12) is rotatably supported by the impeller-side radial bearing (15) and a part of the shaft member (52) distant from the impeller (12) is rotatably supported by rotor-side radial bearing (56). Therefore, bending of the shaft member (52) in a surge state can be suppressed in a well-balanced manner.

With the centrifugal compressor according to the present modification, because the rotor-side radial bearing (55) is not provided, the size of the centrifugal compressor can be reduced.

Third Modification

Figure 8:
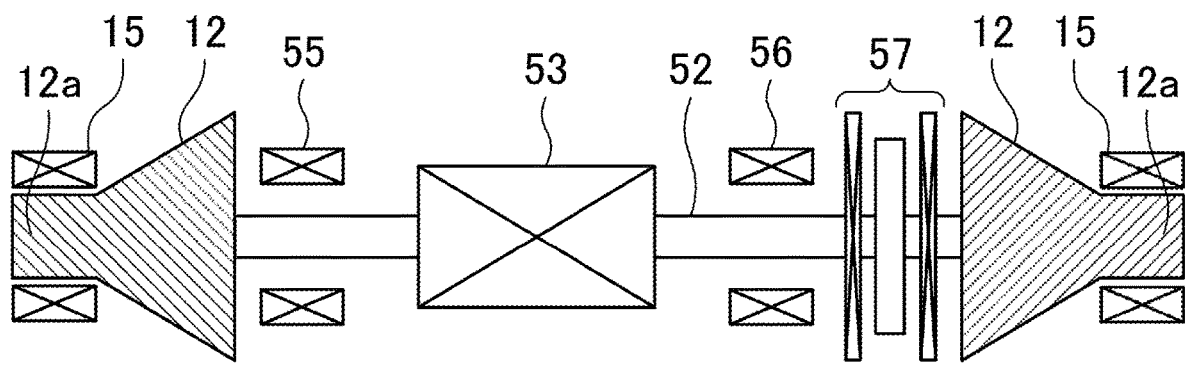
FIG. 8 is a schematic view of a centrifugal compressor according to a third modification.

FIG. 8 is a schematic view of a centrifugal compressor according to a third modification. In FIG. 8, constituent elements that are the same as those of the embodiment illustrated in FIG. 4 are denoted by the same numerals. Although illustrations of the plurality of blades (122, 123) and the cover member (125) of the impeller (12) are omitted for simplicity in FIG. 8, the cover member (125) is joined to the outer peripheries of the plurality of blades (122, 123) in the radial direction, and the plurality of blades (122, 123) are covered by the cover member (125) from outside in the radial direction.

As illustrated in FIG. 8, the centrifugal compressor according to the present modification differs from the embodiment illustrated in FIG. 4 in the following respects: the centrifugal compressor has a two-stage back-to-back configuration in which the impeller (12) is disposed at each of two end portions of the shaft member (52); and the impeller-side radial bearings (15) are disposed outside in the radial direction of the front end portions (12a) of both of the impellers (12) (to be specific, parts of the cover members (125) covering the front end portions (12a)).

Advantageous Effects of Third Modification

With the centrifugal compressor according to the present modification described above, also in the back-to-back configuration, bending of the shaft member (52) in a surge state can be suppressed by using the impeller-side radial bearings (15) provided for both of the impellers (12).

In the present modification, if bending of the shaft member (52) in a surge state does not cause a problem, the impeller-side radial bearing (15) may be provided only for one of the impellers (12).

Fourth Modification

Figure 9A:
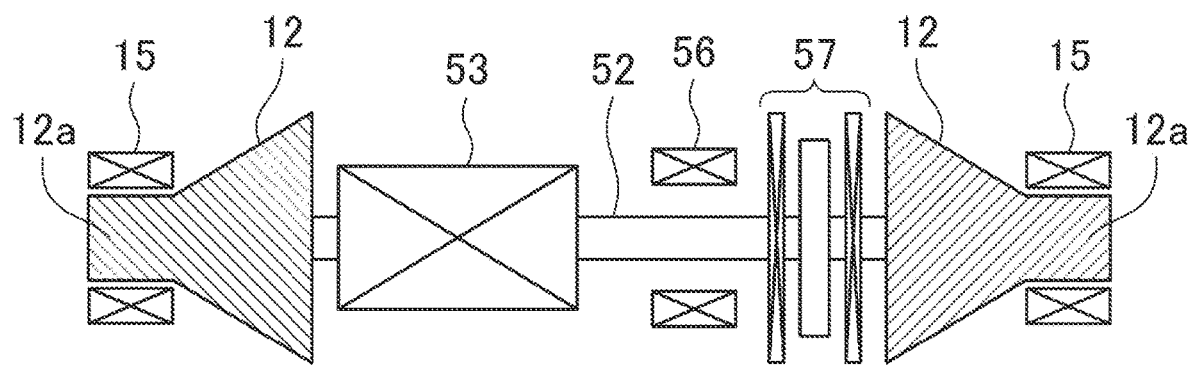
FIG. 9A is a schematic view of a centrifugal compressor according to a fourth modification.

FIG. 9A is a schematic view of a centrifugal compressor according to a fourth modification. In FIG. 9A, constituent elements that are the same as those of the embodiment illustrated in FIG. 4 and the third modification illustrated in FIG. 8 are denoted by the same numerals. Although illustrations of the plurality of blades (122, 123) and the cover member (125) of the impeller (12) are omitted for simplicity in FIG. 9A, the cover member (125) is joined to the outer peripheries of the plurality of blades (122, 123) in the radial direction, and the plurality of blades (122, 123) are covered by the cover member (125) from outside in the radial direction.

The centrifugal compressor according to the present modification differs from the third modification illustrated in FIG. 8 in that, as illustrated in FIG. 9A, among the rotor-side radial bearings (55) and (56) that rotatably support the shaft member (52), the rotor-side radial bearing (55) is not provided.

Advantageous Effects of Fourth Modification

With the centrifugal compressor according to the present modification described above, in addition to advantageous effects similar to those of the third modification described above, it is possible to obtain an advantageous effect that the size of the centrifugal compressor can be reduced because the rotor-side radial bearing (55) is not provided.

Figure 9B:
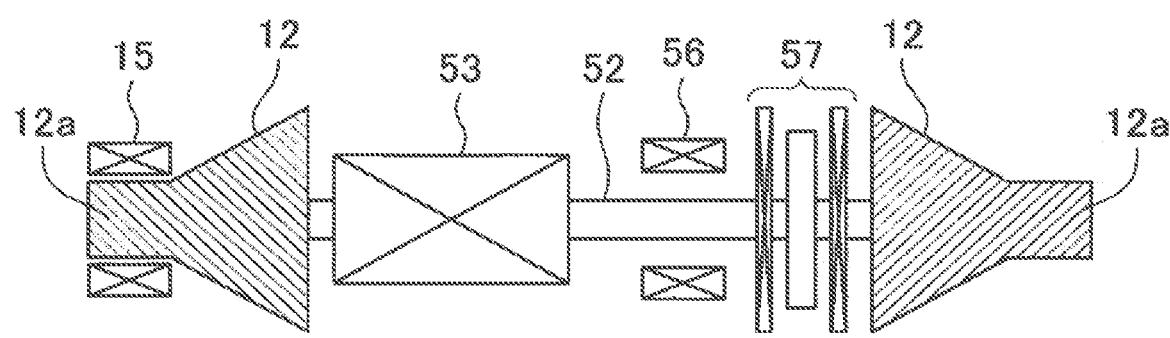
FIG. 9B is a schematic view of a centrifugal compressor according to a modification to the fourth modification of FIG. 9A.

In the present modification, if bending of the shaft member (52) in a surge state does not cause a problem, the impeller-side radial bearing (15) may be provided for only one of the impellers (12), as shown in FIG. 9B. For example, the impeller-side radial bearing (15) need not be provided for the impeller (12) on the thrust bearing (57) side, as shown in FIG. 9B. On the other hand, when the impeller-side radial bearing (15) is provided only for the impeller (12) on the thrust bearing (57) side, among the rotor-side radial bearings (55) and (56), preferably, the rotor-side radial bearing (56) near the impeller (12) on the thrust bearing (57) side is not provided. By doing so, the impeller (12) on the thrust bearing (57) side is rotatably supported by the impeller-side radial bearing (15), and a part of the shaft member (52) distant from the impeller (12) is rotatably supported by the rotor-side radial bearing (55). Therefore, bending of the shaft member (52) in a surge state can be suppressed in a well-balanced manner.

Fifth Modification

Figure 10:
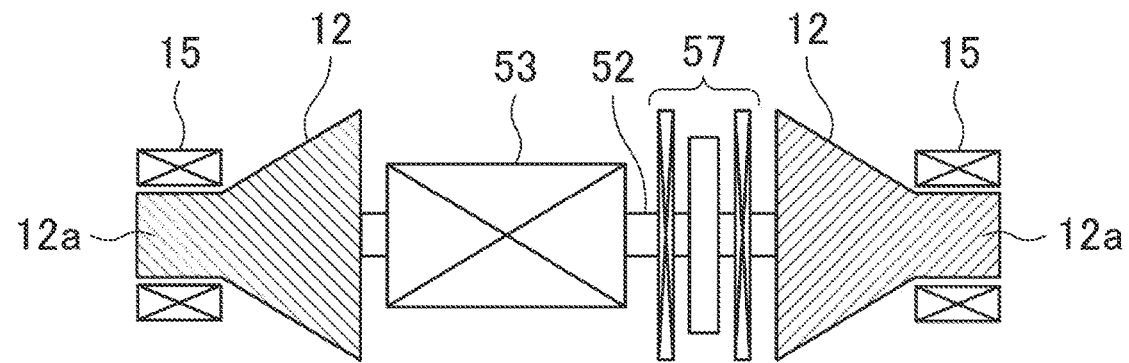
FIG. 10 is a schematic view of a centrifugal compressor according to a fifth modification.

FIG. 10 is a schematic view of a centrifugal compressor according to a fifth modification. In FIG. 10, constituent elements that are the same as those of the embodiment illustrated in FIG. 4 and the third modification illustrated in FIG. 8 are denoted by the same numerals. Although illustrations of the plurality of blades (122, 123) and the cover member (125) of the impeller (12) are omitted for simplicity in FIG. 10, the cover member (125) is joined to the outer peripheries of the plurality of blades (122, 123) in the radial direction, and the plurality of blades (122, 123) are covered by the cover member (125) from outside in the radial direction.

The centrifugal compressor according to the present modification differs from the third modification illustrated in FIG. 8 in that, as illustrated in FIG. 10, both of the rotor-side radial bearings (55) and (56) that rotatably support the shaft member (52) are not provided.

Advantageous Effects of Fifth Modification

With the centrifugal compressor according to the present modification described above, in addition to advantageous effects similar to those of the third modification described above, it is possible to obtain an advantageous effect that the size of the centrifugal compressor can be further reduced because both of the rotor-side radial bearings (55) and (56) are not provided.

In the present modification, the impellers (12) disposed at both end portions of the shaft member (52) are rotatably supported by the impeller-side radial bearings (15). Therefore, bending of the shaft member (52) in a surge state can be suppressed in a well-balanced manner.

Sixth Modification

Figure 11:
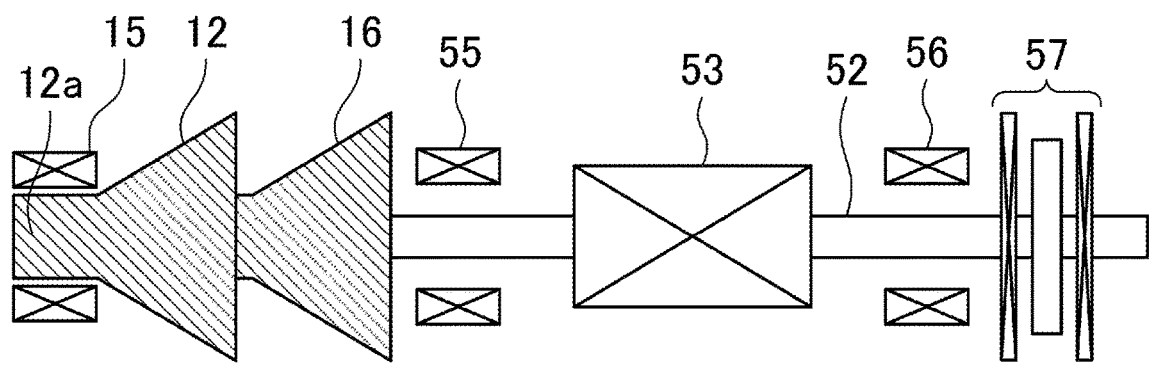
FIG. 11 is a schematic view of a centrifugal compressor according to a sixth modification.

FIG. 11 is a schematic view of a centrifugal compressor according to a sixth modification. In FIG. 11, constituent elements that are the same as those of the embodiment illustrated in FIG. 4 are denoted by the same numerals. Although illustrations of the plurality of blades (122, 123) and the cover member (125) of the impeller (12) are omitted for simplicity in FIG. 11, the cover member (125) is joined to the outer peripheries of the plurality of blades (122, 123) in the radial direction, and the plurality of blades (122, 123) are covered by the cover member (125) from outside in the radial direction.

The centrifugal compressor according to the present modification differs from the embodiment illustrated in FIG. 4 in that, as illustrated in FIG. 11, the centrifugal compressor has a two-stage inline configuration in which the impeller (12) is disposed at one end portion of the shaft member (52) via an impeller (16) of the second stage.

Advantageous Effects of Sixth Modification

With the centrifugal compressor according to the present modification described above, also in the inline configuration, bending of the shaft member (52) in a surge state can be suppressed by using the impeller-side radial bearing (15) provided for the impeller (12) of the first stage.

Seventh Modification

Figure 12:
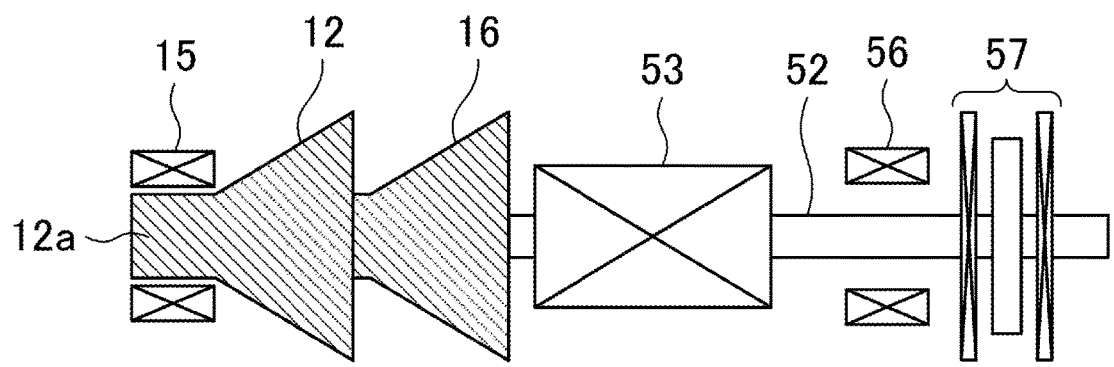
FIG. 12 is a schematic view of a centrifugal compressor according to a seventh modification.

FIG. 12 is a schematic view of a centrifugal compressor according to a seventh modification. In FIG. 12, constituent elements that are the same as those of the embodiment illustrated in FIG. 4 and the sixth modification illustrated in FIG. 11 are denoted by the same numerals. Although illustrations of the plurality of blades (122, 123) and the cover member (125) of the impeller (12) are omitted for simplicity in FIG. 12, the cover member (125) is joined to the outer peripheries of the plurality of blades (122, 123) in the radial direction, and the plurality of blades (122, 123) are covered by the cover member (125) from outside in the radial direction.

The centrifugal compressor according to the present modification differs from the sixth modification illustrated in FIG. 11 in that, as illustrated in FIG. 12, among the rotor-side radial bearings (55) and (56) that rotatably support the shaft member (52), the rotor-side radial bearing (55) near the impeller (12) is not provided.

Advantageous Effects of Seventh Modification

With the centrifugal compressor according to the present modification described above, in addition to advantageous effects similar to those of the sixth modification described above, it is possible to obtain an advantageous effect that the size of the centrifugal compressor can be reduced because the rotor-side radial bearing (55) is not provided.

In the present modification, the impeller (12) is rotatably supported by the impeller-side radial bearing (15), and a part of the shaft member (52) distant from the impeller (12) is rotatably supported by rotor-side radial bearing (56). Therefore, bending of the shaft member (52) in a surge state can be suppressed in a well-balanced manner.

Other Embodiments

In the centrifugal compressor according to the present disclosure, the shape and the like of the impeller (12), the material and the like of the cover member (125, 126), and the type and the like of the impeller-side radial bearing (15) are not limited, as long as the cover member (125, 126) is disposed at least at the front end portion (12a) of the impeller (12) and the impeller-side radial bearing (15) that rotatably supports the impeller (12) is disposed outside in the radial direction of the cover member (125, 126).

For example, although the impeller (12) is attached to one end portion of the shaft member (52) in the embodiment (including the modifications), the shaft member (52) may extend through the impeller (12). However, when the shaft member (52) extends through the impeller (12), in particular, when the shaft member (52) protrudes from the front surface of the impeller (12), another problem may arise in that the shape of the impeller may be restricted and it becomes difficult to optimize the centrifugal compressor.

In the centrifugal compressor according to the present disclosure, the impeller-side radial bearing (15) may have a sealing function in order to suppress reverse flow of a compressed refrigerant from the discharge opening (11b) side to the intake opening (11a) side through a flow path formed between the outer curved surface (125x) of the cover member (125) and the front wall (11x) of the impeller housing (11c). Thus, the operation efficiency of the centrifugal compressor can be further increased. Alternatively, a sealing member that is independent from the impeller-side radial bearing (15) may be disposed between the outer curved surface (125x) of the cover member (125) and the front wall (11x) of the impeller housing (11c).

The impeller-side radial bearing (15) according to the present disclosure is widely applicable not only to the centrifugal compressors illustrated in FIGS. 1 to 4 and 6 to 12, but also to compressors, fans, and the like of other types, as long as these are devices or machines have a configuration in which a rotation shaft on which an impeller is disposed is supported in a non-contact manner from outside in the radial direction.

It should be understood that the embodiments and the modifications described above can be modified in forms and details in various ways within the spirit and scope of the claims. The embodiments, the modifications, and the other embodiments may be combined and replaced as appropriate, as long as the functions of the object of the present disclosure are not hindered. Moreover, terms such as "first", "second", "third", and the like are used to discriminate between words or phrases to which these terms are attached, and do not limit the number and the order of the words or phrases.

The present disclosure is applicable to centrifugal compressors.

The invention claimed is:

1. A centrifugal compressor comprising:
   a shaft member that extends in an axial direction and that is rotatable;
   a motor that drives rotation of the shaft member; and
   an impeller configured to include:
      a hub that is disposed on an end portion of the shaft member and
      a plurality of blades disposed on an outer peripheral surface of the hub,
   the impeller having a shape that tapers outward in the axial direction,
   a cover member being disposed at least at an end portion of the impeller outside in the axial direction, the cover member being joined to outer peripheries of the plurality of blades in a radial direction and covering at least a part of the plurality of blades from outside in the radial direction,
   a first bearing disposed outside in the radial direction of the cover member, the first bearing rotatably supporting the impeller,
   a second bearing disposed outside in the radial direction of the shaft member in a part located opposite to the impeller as viewed from the motor, the second bearing rotatably supporting the shaft member, and
   a third bearing rotatably supporting the shaft member is not provided outside in the radial direction of the shaft member in a part located between the motor and the impeller.

2. The centrifugal compressor according to claim 1, wherein
   the cover member is a shroud that covers an entirety of the plurality of blades.

3. The centrifugal compressor according to claim 1, wherein
   the first bearing is gas bearing.

4. The centrifugal compressor according to claim 2, wherein
   the first bearing is a gas bearing.

5. The centrifugal compressor according to claim 1, wherein
   the impeller is a first impeller, the centrifugal compressor further comprises a second impeller configured the same as the first impeller, the first and second impellers are disposed at each of two end portions of the shaft member, the first bearing is provided for the cover member of the first impeller, and
   a fourth bearing that rotatably supports the second impeller is not provided outside in a radial direction of the second impeller.

6. The centrifugal compressor according to claim 2, wherein
   the impeller is a first impeller, the centrifugal compressor further comprises a second impeller configured the same as the first impeller, the first and second impellers are disposed at each of two end portions of the shaft member, the first bearing is provided for the cover member of the first impeller, and
   a fourth bearing that rotatably supports the second impeller is not provided outside in a radial direction of the second impeller.

7. The centrifugal compressor according to claim 3, wherein
   the impeller is a first impeller, the centrifugal compressor further comprises a second impeller configured the same as the first impeller, the first and second impellers are disposed at each of two end portions of the shaft member, the first bearing is provided for the cover member of the first impeller, and
   a fourth bearing that rotatably supports the second impeller is not provided outside in a radial direction of the second impeller.

* * * * *